Nov. 4, 1969   W. J. NEILSON   3,476,446
ROCK BIT AND BEARING
Filed June 8, 1967

INVENTOR
WILLIAM J. NEILSON
BY
ATTORNEY

United States Patent Office 3,476,446
Patented Nov. 4, 1969

3,476,446
ROCK BIT AND BEARING
William J. Neilson, Whittier, Calif., assignor to Smith Industries International, Inc., Compton, Calif., a corporation of California
Filed June 8, 1967, Ser. No. 644,525
Int. Cl. F16c 19/14; E21b 9/10, 9/35
U.S. Cl. 308—8.2                           1 Claim

ABSTRACT OF THE DISCLOSURE

A floating antifriction bearing of one piece with inner and outer concentric bearing surfaces, each divided into sections by surface interruptions with the total area of the outer bearing surfaces less than that of the inner bearing surfaces in such ratio that their frictional drag is substantially the same, and random indexing of the bearing is provided.

---

This invention relates to an antifriction bearing which has some similarity to my application for patent, Ser. No. 625,389, filed Mar. 23, 1967 on Floating Segment Bearing. In both inventions a general object to be desired is to provide a floating bearing having inner and outer bearing surfaces wherein the total outer bearing surface area is so related to the total inner bearing surface area that the frictional drag on both is substantially equalized and there will be random indexing of the bearing with substantially equal total movement of the bearing relative to the inner and outer relatively rotatable parts between which it is located.

In the above identified application for patent the bearing is made in segments so that each segment can find its own seating position between the relatively rotatable parts with which it is used, independently of the seating of the other segments. The segmented bearing of the other application can be installed between two relatively rotatable parts by feeding successive segments through a suitable bore to the bearing cavity.

The present invention is directed to a one-piece sleeve or annulus which, while it must be able to receive the inner of a pair of rotatable parts in a direction axially of its axis of rotation, it can be formed in one piece with a minimum of expense, and when formed according to the invention, will provide random indexing of the bearing relative to the inner and outer relatively rotatable parts between which it is used. However, instead of making up a plurality of segments, as in the previously filed application, the entire bearing can be formed of one piece with surface interruptions about one or both of the inner and outer bearing surfaces with the total of the interruptions in the outer bearing surface greater than the total in the inner bearing surface so that the total of the outer frictional contact surface is slightly less than the inner frictional contact surface. This is provided because the outer frictional contact or bearing surface is a greater distance from the axis of rotation of the movable parts relative to one another with a resulting greater leverage exerted with regard to the outer bearing surface. Taking this into account, the drag on the inner and outer bearing surfaces can be substantially equalized so that the bearing will not only index at random but the movement of the bearing relative to the inner relatively movable part will be approximately the same as its movement relative to the outer relatively movable or rotatable part.

The above and other objects will more fully appear from the following description in connection with the accompanying drawing.

As brought out in the above identified application, ball bearings, roller bearings, or needle bearings, are widely used in place of stationary sleeve bearings because of the reduced areas of contact between said bearings and the parts with which they are used, and also because they rotate individually between the relatively rotatable parts whose friction they are intended to reduce.

However, in environments where there are relatively heavy loads, ball bearings, roller bearings and needle bearings have such small points or lines of contact with the surfaces of the relatively rotatable parts that one or both of the parts will soon be subject to spalling. For example, in the use of rock bits for deep well drilling, a bit may comprise three journals, each with a rotary cutter thereon. The bit as a unit may be subject to pressures as great as 75,000 lbs., so that each of the three sets of journals and cutters is subjected to a pressure of 25,000 lbs. Since the weight is usually directed diagonally downwardly, the undersides of the relatively stationary journals will, in a relatively short time, become spalled and the bit must be replaced or the journal refinished. This failure is thought to be due to the fact that the point or line contact of a ball or roller bearing creates so much pressure on the journal bearing surface that the metal thereof breaks down due to fatigue and spalling occurs.

It is an object of the invention to provide a floating sleeve bearing which is relatively simple to manufacture and install, wherein the sleeve has a multiple of bearing sections separated by surface interruptions so that the continuous frictional surface of a conventional sleeve bearing is eliminated, yet wherein the weight imposed on the bearing is distributed rather widely over a total surface area.

Another object is to provide a floating multiple surface section sleeve bearing of softer metal than the parts between which it functions wherein the bearing will index at random and whereby the bearing, rather than the relatively rotatable parts, will wear, and by reason of the random indexing, the wear will be uniformly distributed.

Another object of the invention is to provide a bearing construction of the type described wherein the interruptions in the bearing surface provide means for distributing lubricant about the bearing, to improve the wearing qualities of the bearing and the parts, particularly where the lubricant contains finely divided metallic lead.

Other objects and advantages of the invention will more fully appear from the following description in connection with the accompanying drawing.

Figure 1:
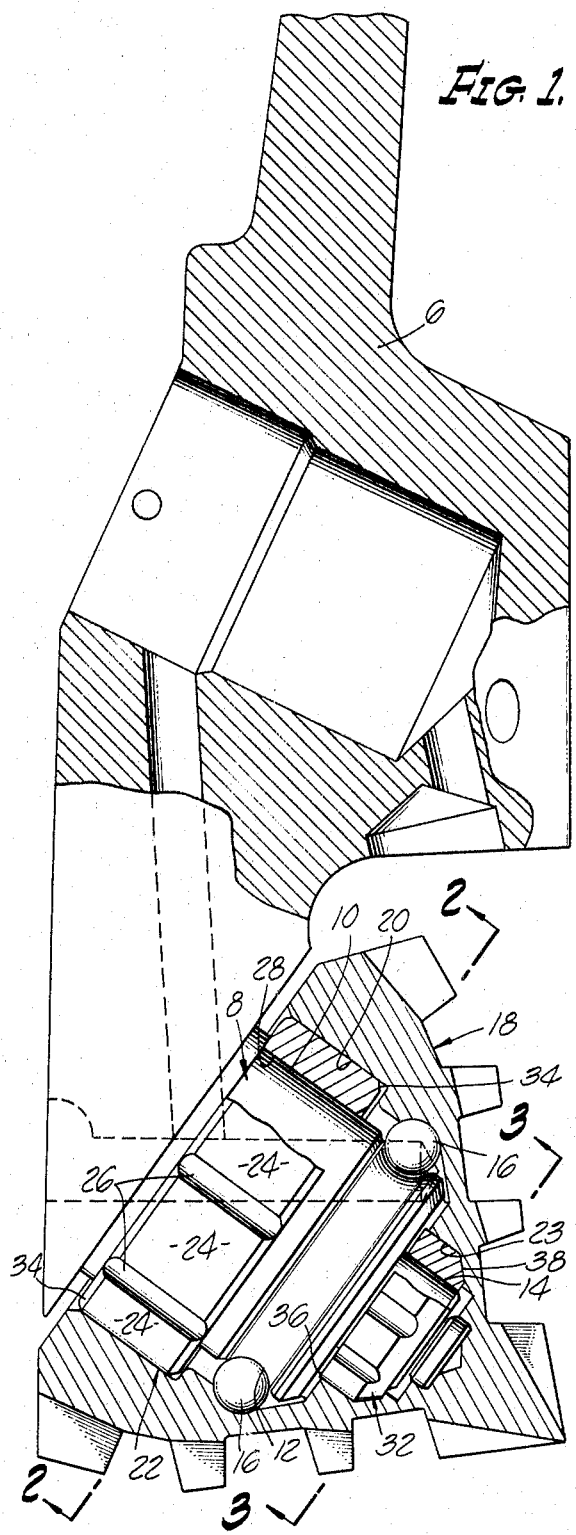
FIG. 1 is a view of a portion of a drill bit partially in section with embodiments of the invention incorporated therein.
Figure 2:
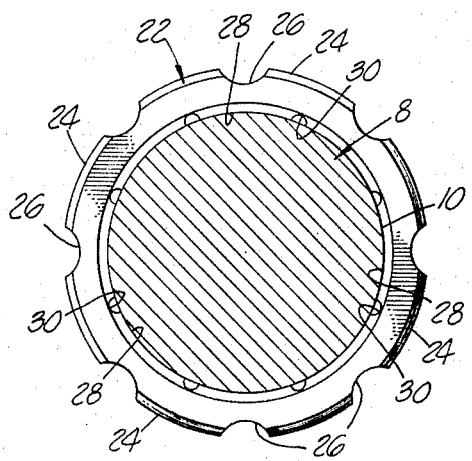
FIG. 2 is a sectional view taken approximately on the line 2—2 of FIG. 1.

There is illustrated a drill body 6 having a journal 8 extending downwardly and outwardly therefrom. The journal has a diameter 10, a circumferential grooved portion 12, and an end with a smaller diameter 14. Customarily, the transversely flat diameters 10 and 14 comprise bearing surfaces which would accommodate roller bearings and the groove 12 would accommodate ball bearings, indicated at 16.

Located on the journal 8 for rotation thereon, is a conventional drill bit cutter 18 having a bearing race 20 of larger diameter and a race 23 of smaller diameter, these bearing races lying concentrically outwardly of the journal bearing surfaces 10 and 14.

Located between the journal bearing surface 10 and the cutter bearing race 20 is a sleeve bearing 22 having outer bearing surface sections 24 separated by surface interruptions 26. The bearing 22 has inner bearing surface sections 28 separated by inner bearing surface interruptions 30. The outer bearing surface sections 24 have a total area which is slightly less than the total area of the inner bearing surface sections 28. This is provided because the radii of the outer bearing surfaces 24 are greater in length than those of the inner bearing surfaces 28. If the outer and inner bearing surfaces were of equal area, the greater leverage provided by the longer radii of the outer bearing surfaces 24 would cause the bearing 22 to tend to move with the rotary cutter 18 about the journal 8 so that there would be little or no wear on the cutter bearing race surface 20 and there would be excessive wear on the journal bearing surface 10.

To provide outer bearing surface sections 24 of sufficiently greater area to overcome the difference in radii between the inner and outer portions, the surface interruptions 26 separating said outer bearing surface sections 24 are greater in which (circumferentially of the bearing) than the surface interruptions 30 on the inner portion of the bearing. They are sufficiently greater than the inner interruptions 30 so that each of the outer bearing surface sections 24 is slightly smaller than those of the inner surface sections 28.

Figure 3:
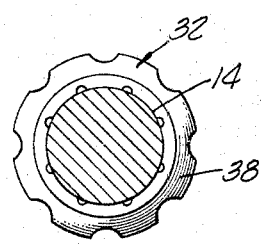
FIG. 3 is a sectional view taken approximately on the line 3—3 of FIG. 1.

In FIG. 3 there is shown asmaller sleeve bearing 32 on the reduced journal portion 14. It is formed on the same principles as those in connection with the larger bearing 22. In the bearing 22 the outer side corners 34 are chamfered equally. In the bearing 32 there is a chamfered corner 36 similar to the corners 34 on bearing 22, but on the other side of the bearing 32, the chamfer 38 is considerably greater. The chamfers are provided merely to eliminate sharp corners and to facilitate the movement of lubricant to different portions of the bearing. The larger chamfer 38 on the bearing 32 is provided merely to accommodate my bearing to cone cutters, such as the cutter 18, of conventional construction presently in use.

I have illustrated ball bearings 16 in the race groove 12 between the sleeve bearings 22 and 32. These could be replaced by a split bearing formed in accordance with the invention, if desired.

It should be understood that various changes can be made in the form, details, arrangement and proportions of the various parts, without departing from the spirit of the invention.

I claim:
1. In a drill cutter, a floating bearing between relatively rotatable parts thereof and in frictional contact therewith wherein the improvement comprises: a rigid metallic circular one-piece floating bearing element having inner and outer frictional bearing surfaces on concentric annuli, said inner bearing surfaces having circumferentially spaced longitudinally extending arcuate grooves therein and said outer bearing surfaces having circumferentially spaced longitudinally extending arcuate grooves therein, said inner grooves being of smaller arcuate extent than said outer grooves rendering said outer frictional bearing surfaces slightly reduced in area relative to the area of the inner surface to compensate for the greater leverage inherent in the longer radius of the outer bearing surface and to provide a balanced frictional bearing surface ratio between said inner and outer bearing surfaces and the respective load bearing surfaces of said relatively rotatable parts, to provide random indexing and wear distribution of the bearing elements relative to said rotatable parts.

References Cited

UNITED STATES PATENTS

| | | | |
|---|---|---|---|
| 824,628 | 6/1906 | Curtis | 308—237 X |
| 1,483,903 | 2/1964 | Masury | 308—238 |
| 1,636,499 | 7/1927 | Chapman. | |
| 2,104,819 | 1/1938 | Schlumpf | 308—8.2 |
| 2,106,860 | 2/1938 | Tibbetts. | |
| 3,076,683 | 2/1963 | Hanley | 308—238 X |
| 3,086,826 | 4/1963 | Gunnell | 308—238 X |
| 3,131,977 | 5/1964 | Wirtz | 308—238 |
| 3,235,316 | 2/1966 | Whanger | 308—8.2 |
| 3,348,887 | 10/1967 | Sheps | 308—238 |
| 901,866 | 10/1908 | Atkinson. | |

FOREIGN PATENTS

| | | |
|---|---|---|
| 561,503 | 3/1954 | Canada. |
| 987,163 | 8/1951 | France. |
| 614,121 | 12/1948 | Great Britain. |
| 430,191 | 6/1935 | Great Britain. |

OTHER REFERENCES

German printed application 1,007,123.

MARTIN P. SCHWADRON, Primary Examiner

L. L. JOHNSON, Assistant Examiner

U.S. Cl. X.R.

115—371; 308—237, 240